United States Patent
Tanaka

(10) Patent No.: US 6,832,777 B2
(45) Date of Patent: Dec. 21, 2004

(54) GAS GENERATOR

(75) Inventor: Shinichi Tanaka, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/091,533

(22) Filed: Mar. 7, 2002

(65) Prior Publication Data
US 2002/0135171 A1 Sep. 26, 2002

(30) Foreign Application Priority Data

Mar. 23, 2001 (JP) ........................................ 2001-085453

(51) Int. Cl.$^7$ ............................................. B60R 21/26
(52) U.S. Cl. ....................................... 280/731; 280/741
(58) Field of Search ................................ 280/741, 736, 280/737, 731

(56) References Cited

U.S. PATENT DOCUMENTS

| | | | | |
|---|---|---|---|---|
| 4,530,516 A | * | 7/1985 | Adams et al. | 280/741 |
| 4,561,675 A | * | 12/1985 | Adams et al. | 280/734 |
| 5,104,466 A | * | 4/1992 | Allard et al. | 149/21 |
| 5,501,152 A | * | 3/1996 | Zeuner et al. | 102/292 |
| 5,613,705 A | * | 3/1997 | Hock et al. | 280/741 |
| 5,613,706 A | * | 3/1997 | Parker et al. | 280/741 |
| 5,753,852 A | * | 5/1998 | Bernau et al. | 102/530 |
| 5,779,267 A | * | 7/1998 | Jordan et al. | 280/740 |
| 5,829,785 A | * | 11/1998 | Jordan et al. | 280/741 |
| 5,834,679 A | * | 11/1998 | Seeger | 102/288 |
| 6,527,297 B1 | * | 3/2003 | Parkinson et al. | 280/741 |

* cited by examiner

*Primary Examiner*—David R. Dunn
*Assistant Examiner*—Laura B. Rosenberg
(74) *Attorney, Agent, or Firm*—Manabu Kanesaka

(57) ABSTRACT

A gas generator includes a container having an outer shell; a gas initiator disposed in the container; an igniter for igniting the gas initiator; and a partition disposed in the outer shell for dividing the container into a plurality of gas initiator chambers and having a positioning member for positioning the igniter in an inserting direction of the igniter into the partition. The igniter can be positioned inside the partition with high accuracy.

2 Claims, 5 Drawing Sheets

GAS GENERATOR

BACKGROUND OF THE INVENTION AND RELATED ART STATEMENT

The present invention relates to a gas generator suitable for an airbag device.

An airbag device installed in a vehicle such as an automobile comprises an airbag, a gas generator normally called as an inflator, and a module cover for covering the airbag. When the automobile is in an emergency such as a collision, the gas generator is activated to inflate the airbag, thereby supporting and protecting an occupant.

FIG. 6 is a side view showing an example of a conventional steering wheel. FIG. 7 is a front view of the same. FIG. 8 is a sectional view taken along line 8—8 in FIG. 7. FIG. 9 is a sectional view of a gas generator built in an airbag device installed in the steering wheel.

As shown in FIGS. 6 and 7, an airbag device 14 is installed inside a steering wheel 10. Numeral reference 12 denotes a spoke portion.

As shown in FIG. 8, the airbag device 14 comprises a retainer 20 securely fixed to a steering wheel by a bracket 18, an airbag 22 attached to the retainer 20 along a periphery of an gas inlet thereof, a gas generator (inflator) 24 fixed to the retainer 20 for ejecting gas into the airbag 22, and a module cover 26 for covering the airbag 22. A base end of the module cover 26 is connected to the retainer 20.

As shown in FIG. 9, the gas generator 24 has an outer shell comprising an upper housing 27 and a lower housing 28, and a cylindrical partition 29 disposed inside the outer shell. One end of the cylindrical partition 29 extends through an opening formed at the bottom of the lower housing 28 to project downwardly. The inner periphery of the opening and the outer periphery of the partition 29 are welded by laser beam welding. An igniting agent (booster propellant) 30 is housed inside the partition 29 and a gas initiator (main propellant) 32 is housed in a space outside the partition 29.

A squib (igniter) 34 is inserted in a portion near the one end of the cylindrical partition 29. The squib 34 is energized via a squib connector 36 and a squib lead 38 so as to ignite the igniting agent 30. When the igniting agent 30 is ignited, gas is ejected through gas ports of the partition 29 so as to ignite the gas initiator 32, thereby rapidly generating gas in large quantity. The gas blows out outside the gas generator 24 through holes 44 after passing through a filter 42 such as a mesh, thereby inflating the airbag 22. As the airbag 22 is inflated, the module cover 26 is broken along a tear line so that the airbag 22 deploys into a vehicle cabin. The steering wheel is secured to a steering shaft by an external thread 46 formed at an upper end portion of the steering shaft and a nut 48.

In the aforementioned gas generator 24, since the position of the squib 34 is difficult to be defined in the inserting direction, the squib 34 may be sometimes inserted too deep into the partition 29 when the squib connector 36 is connected.

It is an object of the present invention to provide a gas generator in which the position of a squib (igniter) can be easily defined in the inserting direction.

Further objects and advantages of the invention will be apparent from the following description of the invention.

SUMMARY OF THE INVENTION

A gas generator of the present invention comprises a container, a gas initiator in the container, and an igniter for igniting the gas initiator. The container comprises an outer shell and a partition at least partially disposed in the outer shell. The container is divided into a plurality of gas initiator chambers by the partition. The igniter is disposed inside the partition by insertion. The partition is provided with a positioning member for positioning the igniter in the inserting direction.

According to the gas generator, the positioning member easily defines a position of the igniter in the inserting direction.

In the gas generator of the present invention, it is preferable that the partition has a cylindrical shape and the positioning member is composed of projections projecting from the inner peripheral surface of the partition. According to this structure, the positioning member can be easily formed by an operation such as pressing, resulting in cost reduction.

DETAILED DESCRIPTION OF PREFERRED EMBODIMENTS

Figure 1:
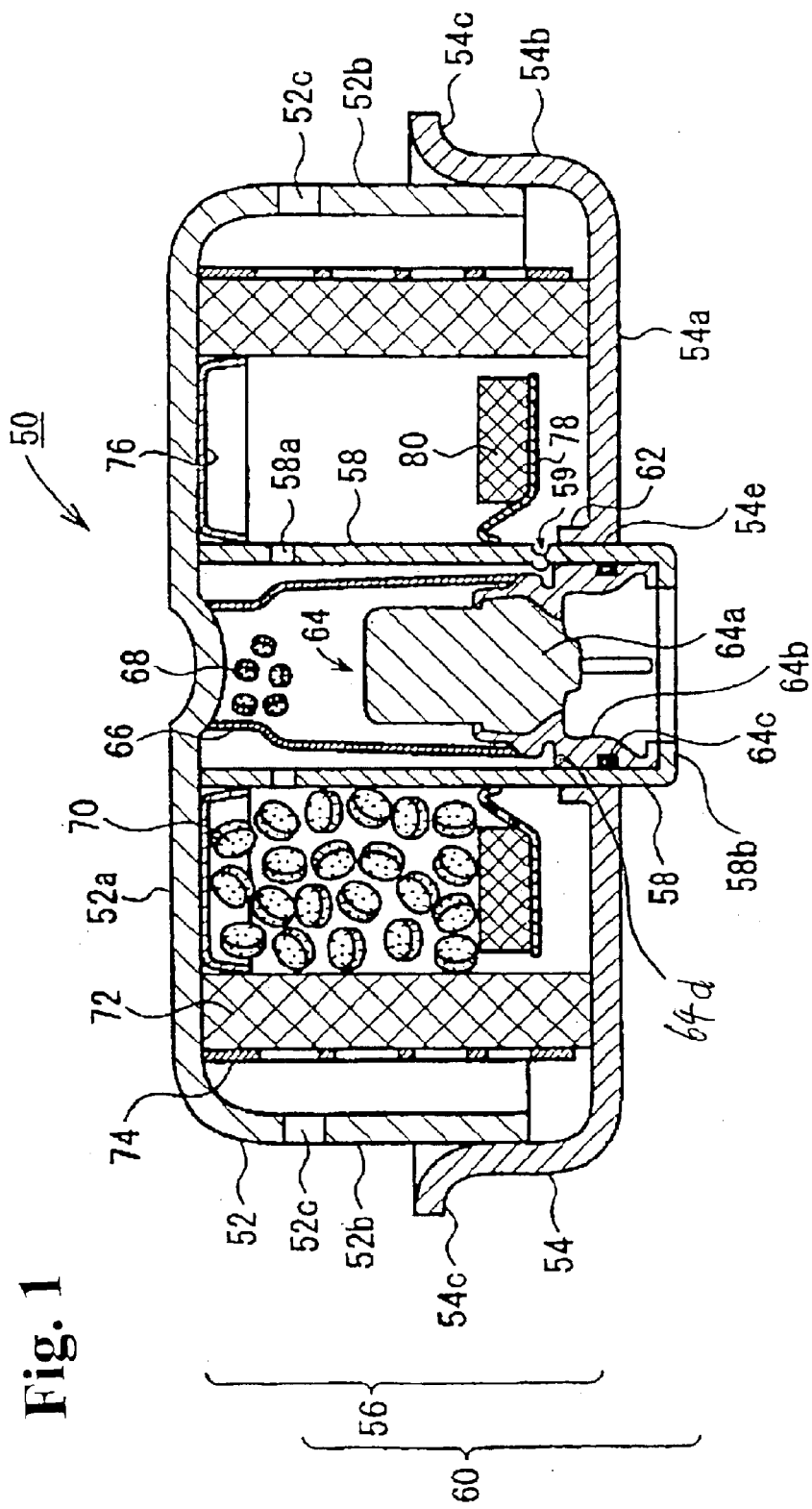
FIG. 1 is a sectional view showing an embodiment of a gas generator of the present invention.
Figure 2:
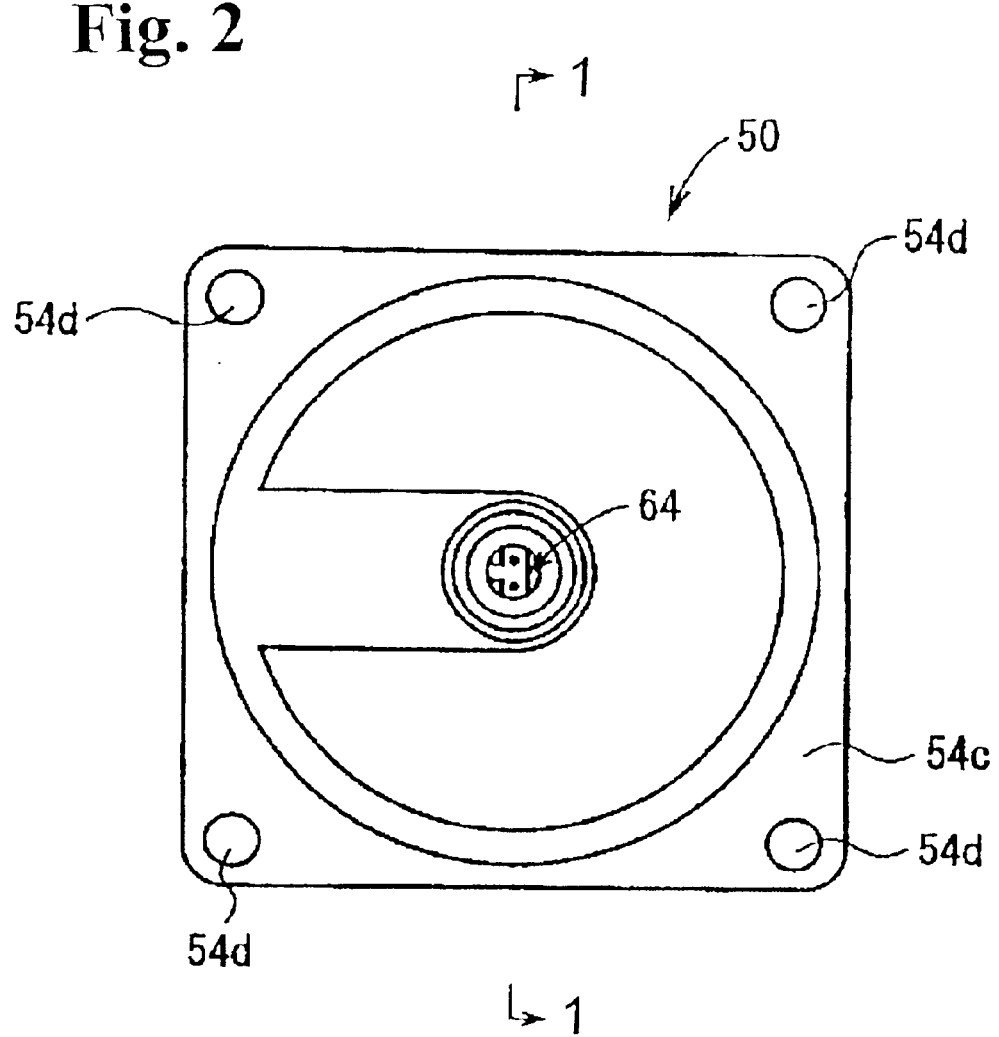
FIG. 2 is a bottom view of the gas generator shown in FIG. 1.
Figure 3:
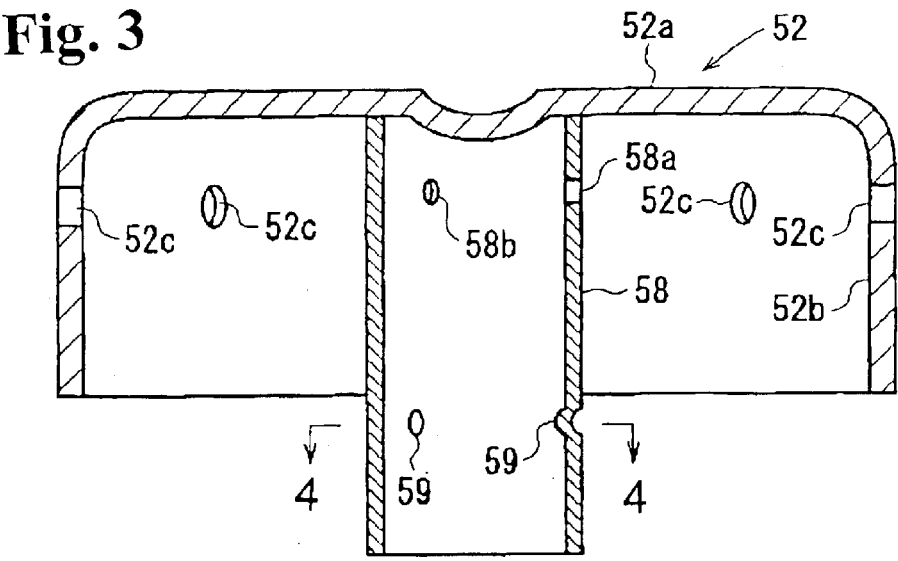
FIG. 3 is a sectional view of an upper housing of the gas generator.
Figure 4:
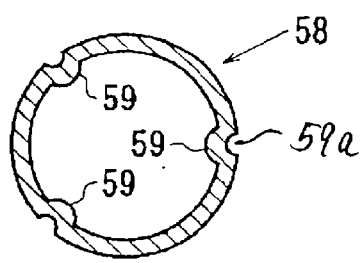
FIG. 4 is a sectional view of the gas generator taken along line 4—4 in FIG. 3.
Figure 5:
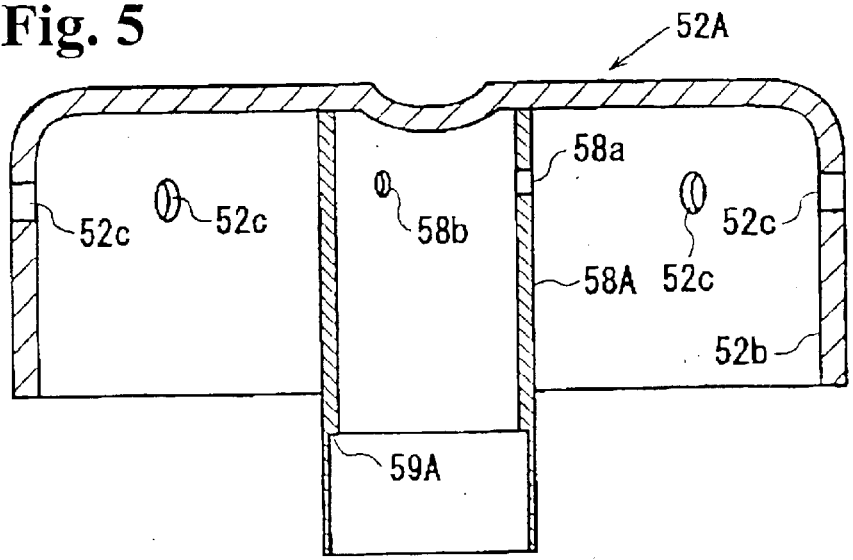
FIG. 5 is a sectional view of an upper housing of a gas generator according to another embodiment of the present invention.
Figure 6:
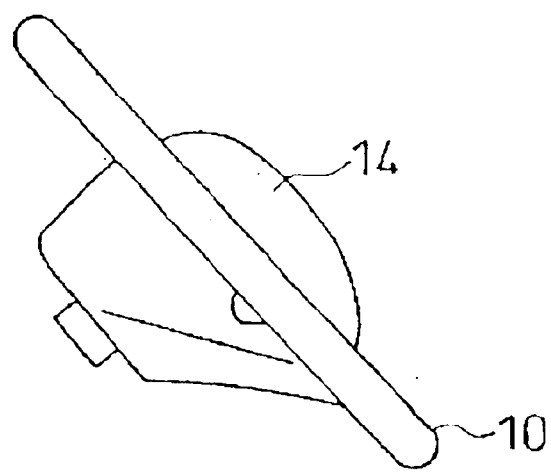
FIG. 6 is a side view of a conventional steering wheel.
Figure 7:
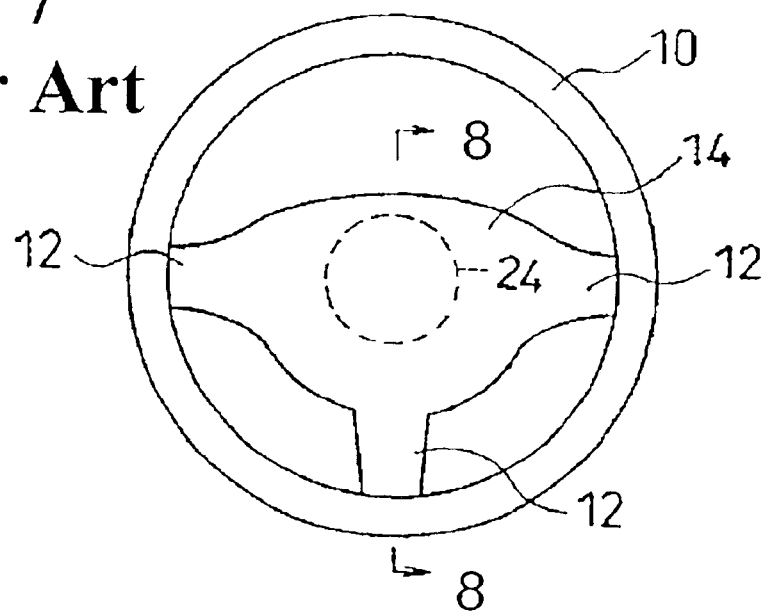
FIG. 7 is a front view of the conventional steering wheel.

Hereunder, embodiments of the invention will be explained with reference to the accompanied drawings. FIG. 1 is a sectional view showing an embodiment of a gas generator of the present invention (sectional view taken along line 1—1 in FIG. 2), FIG. 2 is a bottom view of the gas generator, FIG. 3 is a sectional view of an upper housing of the gas generator, FIG. 4 is a sectional view taken along line 4—4 in FIG. 3, and FIG. 5 is a sectional view of an upper housing according another embodiment.

A gas generator 50 has a container 60. The container 60 comprises an outer shell 56 having an upper housing 52 and a lower housing 54, and a cylindrical partition 58, most of which is disposed in the outer shell 56 and a part of which projects from the outer shell 56.

The upper housing 52 has a disk-like top 52a and a peripheral wall 52b extending downwardly from the periphery of the top 52a. A plurality of gas ports 52c is formed on the peripheral wall 52b.

The partition 58 is arranged coaxially with the peripheral wall 52b of the upper housing 52. The upper end of the partition 58 is fixed to the top 52a by welding such as projection welding, although the fixing method is not limited to welding. The partition 58 is provided with a plurality of gas ports 58a formed in an upper portion thereof.

The lower housing 54 has a disk-like bottom 54a and a peripheral wall 54b extending upwardly from the periphery of the bottom 54a. The upper portion of the peripheral wall 54b curves gradually outwardly, and is continuously connected to a flange 54c. As shown in FIG. 2, the flange 54c is formed in a square shape overhanging from the outer surface of the outer shell 56 and is provided, at the four corners thereof, with through holes 54d for insertion of bolts or rivets.

A circular opening 54e, into which the partition 58 is inserted, is disposed at the center of the bottom 54a. An annular portion 62 is extended upwardly around the edge of the opening 54e.

Most of the partition 58 is positioned inside the outer shell 56, and only a lower end portion of the partition 58 extends through the opening 54e to project downwardly. The partition is provided with projections 59 as positioning members formed by pressing or the like to have dents 59a behind the projections 59. The projections 59 are formed at three locations along the circumferential direction of the partition 58. It should be noted that the number of the projections 59 is not limited thereto.

A squib 64 is inserted into a lower portion of the partition 58. The squib 64 comprises a squib body 64a and a cylindrical squib holder 64b fitted onto the squib body 64a. The squib holder 64b is provided with a shoulder 64d and a gasket groove formed in the outer surface of the squib holder 64b. A gasket 64c is arranged in the gasket groove. As the gasket 64c, an O-ring made of heat-resisting rubber may be used. The gasket 64c closely contacts the inner periphery of the partition 58.

The squib 64 is inserted from the lower end of the partition 58 until the shoulder 64d of the squib holder 64 abuts against the projections 59. Then, the lower end of the partition 58 is formed to have a collar 58b by crimping or the like, whereby the lower end of the squib holder 64b is stopped by the collar 58b. A squib connector is connected to a terminal 64d at the lower end of the squib 64 (not shown).

Inside the partition 58, an enhancer cup 66 made of a low melting metal such as aluminum is disposed. Inside the enhancer cup 66, an igniting agent (booster propellant) 68 is arranged. When the squib 64 is energized, the booster propellant starts to react. At a stage when the temperature and the gas pressure inside the enhancer cup 66 become high enough, the enhancer cup 66 is burst so as to allow a gas to pass through gas ports 58a and flow toward gas initiator (main propellant) 70. As a result, the gas initiator 70 starts to react and generate a gas. As the igniting agent and the gas initiator, sodium azide may be used, though not limited thereto.

The gas initiator 70 is filled in a space between the partition 58 and a filter 72. The filter 72 is made of a net or a mesh of metallic wires and is configured into an annular shape by a press molding. Arranged along a peripheral surface of the filter is an annular filter holder 74 made of a perforated panel such as a punching metal.

A filter-positioning member 76 is disposed between the upper internal surface of the filter 72 and the upper portion of the partition 58. The filter-positioning member 76 is formed in a disk-like shape having a central opening.

A spatter shield 78 is arranged around a lower portion of the partition 58. The spatter shield 78 is formed in a disk-like shape having a central opening. A cushion 80 is disposed on the spatter shield 78. The gas initiator 70 is housed between the filter positioning member 76 and the cushion 80.

Upon manufacturing the gas generator 50, the upper housing 52 and the partition 58 are previously connected to each other by projection welding. The enhancer cup 66, the igniting agent 68, and the squib 64 are inserted into the partition 58. The lower end of the partition 58 is crimped to have the collar 58b.

The upper housing 52 is set upside down with respect to FIG. 1. In this state, the filter positioning member 76 and the filter 72 with the filter holder 74 are disposed inside the upper housing 52 and, then, the gas initiator 70 is filled. The cushion 80 and the spatter shield 78 are disposed by pushing against the gas initiator 70.

The lower housing 54 is attached to the upper housing 52. The opening 54e and the annular portion 62 are set to have an inner diameter that is slightly smaller than the outer diameter of the partition 58, so the partition 58 can be press-fitted into the annular portion 62 and the opening 54e. In addition, the peripheral wall 52b of the upper housing 52 is press-fitted into the peripheral wall 54b of the lower housing 54. After that, the contact portion between the partition 58 and the opening 54e and the portion between the peripheral walls 52b and 54b are welded by laser beam welding, respectively. Since the inner peripheral surface of the annular portion 62 contacts the outer peripheral surface of the partition 58, the welding has enough depth for melting (welding depth in a direction parallel to the axial line of the partition 58). It should be noted that the spatter shield 78 prevents the laser beam from being exposed to the gas initiator 70 during the laser beam welding, and also prevents spatters from hitting the gas initiator 70.

Figure 8:
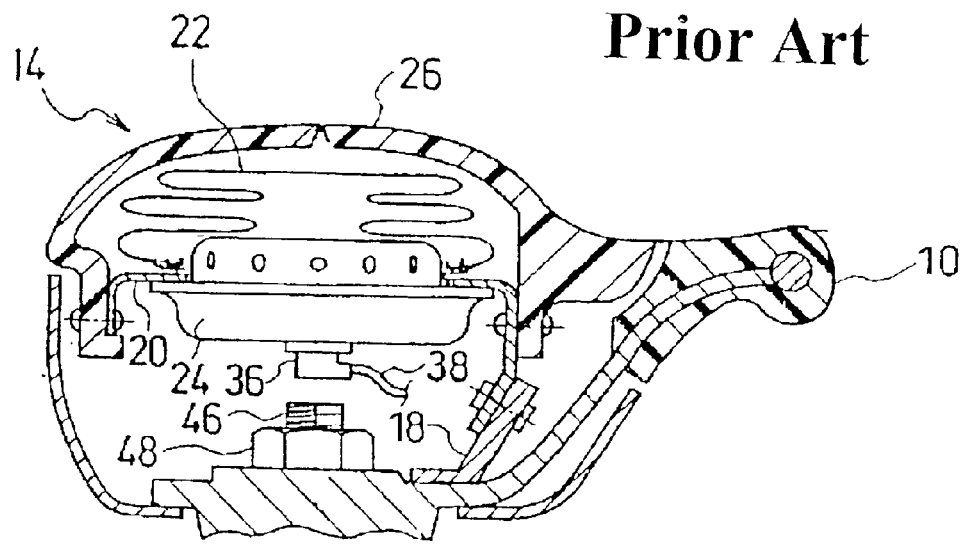
FIG. 8 is a sectional view of the conventional steering wheel taken along line 8—8 in FIG. 7.
Figure 9:
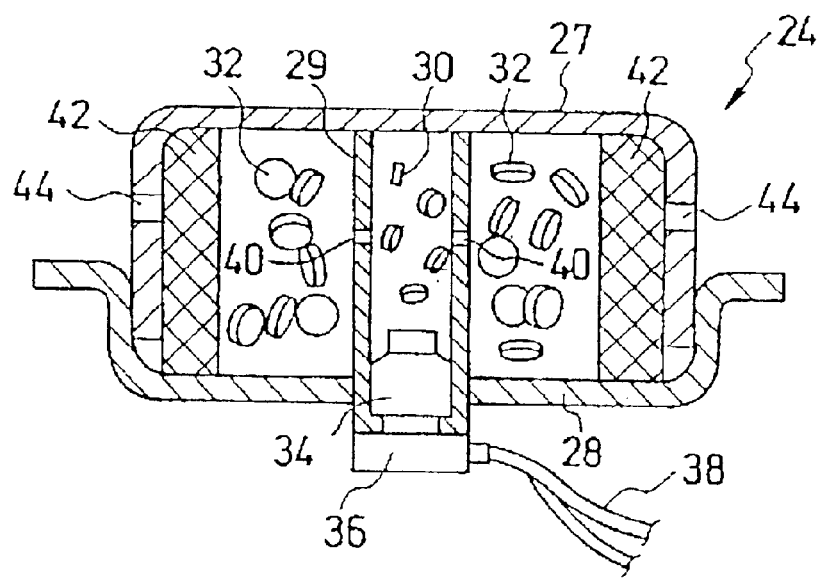
FIG. 9 is a sectional view showing the conventional gas generator of the airbag device shown in FIG. 8.

For example, the gas generator 50 having the aforementioned structure is incorporated in the airbag device as shown in FIG. 8. Although a driver airbag device is shown in FIG. 8, the gas generator may be adapted to various airbag devices such as a front passenger airbag device, a rear passenger airbag device, a side airbag device, and a head protection airbag device.

When the squib 64 of the gas generator 50 is energized, the igniting agent 68 is ignited and gas is spouted out through the gas ports 58a of the partition 58, thereby reacting the gas initiator 70 to generate a gas. Therefore, the gas is generated in large quantity. The gas blows out through the filter 72 and holes 52c of the upper housing 52, thereby inflating the airbag.

Though the positioning member of the squib 64 is composed of the projections 59 in this embodiment, a stepped surface or portion 59A may be formed by machining as a positioning member as shown in FIG. 5. The projections 59 are preferable because the formation thereof is significantly easier than the formation of the stepped surface 59A.

As described above, the present invention provides the gas generator in which the igniter is positioned inside a partition with high positioning accuracy and the airbag device employing this gas generator.

While the invention has been explained with reference the specific embodiments of the invention, the explanation is illustrative and the invention is limited only by the appended claims.

What is claimed is:

1. A gas generator comprising:

a container having an outer shell;

a gas initiator disposed in the container;

a squib disposed adjacent to the gas initiator for igniting the gas initiator and having a squib holder with a shoulder; and a partition disposed in the outer shell for dividing the container into a plurality of gas initiator chambers and having projections projecting from an inner peripheral surface of the partition, dents at sides opposite to the projections, and a collar for holding the squib holder between the projections and the collar, said shoulder being formed at an upper peripheral edge of the squib holder contacting the partition so that when the squib holder is inserted into the partition, the shoulder of the squib holder abuts against the projections to position the squib inside the partition.

2. A gas generator according to claim 1, wherein said partition is cylindrical.

* * * * *